INVENTOR.
RENE LECLERCQ
BY Werner W. Kleeman
ATTORNEY

INVENTOR.
RENE LECLERCQ
BY
ATTORNEY

Oct. 28, 1969
R. LECLERCQ
3,475,595
HEATING GLASS STRUCTURE
Original Filed Jan. 11, 1965
3 Sheets-Sheet 3
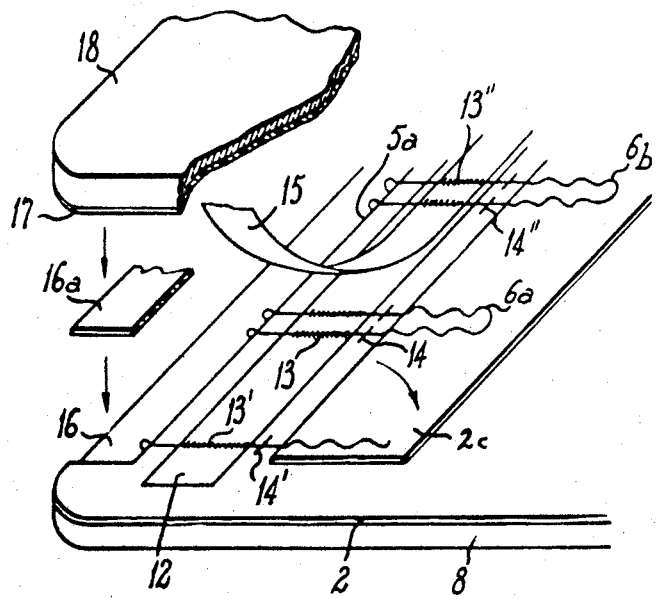
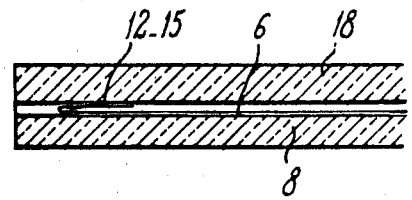
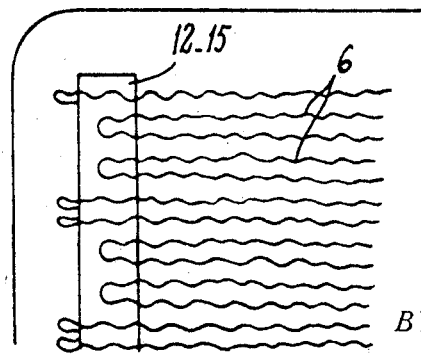
INVENTOR.
RENE LECLERCQ
BY
ATTORNEY United States Patent Office 3,475,595
Patented Oct. 28, 1969

3,475,595
HEATING GLASS STRUCTURE
Rene Leclercq, Antony, Hauts-de-Seine, France, assignor to Jean-Pierre de Montmollin and Rene Gugger, both of Neuchatel, Switzerland
Original application Jan. 11, 1965, Ser. No. 424,597, now Patent No. 3,383,762, dated May 21, 1968. Divided and this application Mar. 11, 1968, Ser. No. 736,867
Int. Cl. H05b 3/06
U.S. Cl. 219—522                    2 Claims

ABSTRACT OF THE DISCLOSURE

A heating glass structure comprising a pair of glass plates between which there is imbedded a layer of wire means providing electrical resistors. The wire means extend between two opposite edges of the glass structure. At least one electrode is disposed in spaced relation from at least one neighboring edge of the opposite edges of the glass structure to provide a space which separates the electrode from the aforesaid one neighboring edge. The layer of wire means includes a number of wires connected with the electrode and extending into at least a portion of the separating space in the direction towards the aforesaid one neighboring edge. The number of wires are flexed backwardly in the separating space to extend towards the other of said opposite edges while passing the electrode without contacting the latter.

---

This application is a divisional application of my copending, commonly assigned U.S. application, Ser. No. 424,597, filed Jan. 11, 1965, entitled: "A Method of Terminating a Heating Glass Structure," and now U.S. Patent No. 3,383,762, dated May 21, 1968.

The present invention relates to an improved heating glass structure as well as to an improved method for its production thereof.

With heating glasses or panes which embrace a so-called netting composed of metal wires providing electric resistors heated by the Joule-effect, these resistors are disposed in parallel between two current lead-in wires or the like formed by thin, conductive bands or strips arranged in the region of two oppositely situated edges of the heating glass. In such an arrangement the borders or edges of the glass structure are not subjected to the heating effect of the resistors. More specifically, this heating effect is not effective at a width of the glass which corresponds to the distance between the border of the glass and the conductive strips, increased by the width of the conductive strips themselves.

The width of this non-heated zone which can be quite appreciable reduces to the same degree the useful surface of the glass. Furthermore, the temperature differences between the cold borders or edges and the region heated by the resistors can be of great importance under certain applications of use of the glass, for example in the case of de-frosting of airplane windows. The differences in elongation resulting from such temperature differences can lead to rupture of the heating wires at the region of their junction with the conductive strips.

Accordingly, it is an important object of the present invention to provide an improved method for the production of heating glass structures of the type described as well as to improved heating glass structures which overcome the previously recited disadvantages.

A further important object of this invention relates to the manufacture of an improved heating glass structure of the hereinmentioned type wherein the heating wires are arranged such that it is possible to considerably reduce the non-heated portions of the glass structure to a minimum as well as to considerably free the heating wires from the stresses brought about by possible temperature differences.

Generally speaking, the improved heating glass structure developed according to the invention is characterized by the features that, the heating wires extend from their end soldered with one of the current lead-in wires or electrodes in a direction towards the edge lying closest to the aforesaid electrode and, more specifically, extend at least into a portion of the space between such electrode and the mentioned edge. In this space such heating wires are flexed back through an angle of substantially 180°, in order then to finally extend in a direction towards the opposite edge of the glass structure. In so doing, these heating wires move past the aforesaid electrode without coming into contact with such.

It should be appreciated that the described arrangement of the heating wire netting according to the invention provides a number of different advantages, of which the more noteworthy ones will now be briefly considered: It is to be realized that the loop which a given wire forms between the electrode and the neighboring edge of the glass structure imparts to such wire a certain flexibility or ductility which increases its resistance to mechanical stresses resulting from temperature differences. On the other hand, the portion of the wire forming the loop as well as the portion of the wire which is directed back past the electrode without coming into electrical contact with such, deliver calories in this marginal zone of the glass structure which, as already mentioned, are not heated without carrying into effect the teachings of the present invention.

The heating glass structure designed according to the teachings of the present invention can be realized in a number of different ways. A particularly advantageous manner of fabrication, which constitutes a further aspect of the subject invention, will now be considered in detail. According to the inventive method for the manufacture of the aforementioned heating glass structure it will be appreciated that in a first stage the heating netting is produced which is embedded upon the surface of a carrier composed of a transparent synthetic resin or plastic foil, such as for example polyvinyl butyral. The heating netting prepared in this manner is bonded upon a glass plate which forms the outer or external element of the heating glass structure, whereby the resistance wires should come into direct contact with the inner surface of this aforesaid element. Both of the current infeed electrodes are arranged at the side of the plastic foil opposite the resistance wires, which in this manner are then insulated from the heating netting through the thickness of the plastic foil. Then the foil is cut at both edges of the heating glass structure and a plastic strip is pulled-off substantially parallel to each electrode. By bending back the edge or edges of the heating netting through 180° towards the inside the resistance wires are brought into contact with the associated current delivery electrode to which they are soldered. The heating glass structure is completed by mounting a second glass plate which should form the inner surface element of the glass structure.

Other features, objects and advantages of the invention will become apparent by reference to the following detailed description and drawings in which.

FIGURES 3, 3a, 4 and 5 schematically illustrate different successive stages of the assembly of the heating netting in the glass structure;

FIGURE 6 is a fragmentary plan view of the completed glass structure; and

FIGURE 7 is a fragmentary, elevational cross-sectional view through the completed glass structure of FIGURE 6.

Describing now the drawings it will be understood that in the illustrated embodiment it is intended to produce a heating glass or pane, hereinafter generally referred to as heating glass structure, which essentially consists of two superimposed glass plates, after there has been embedded between both of these glass plates a netting of heating wires laid upon a carrier which is formed of a plastic foil, such as polyvinyl butyral.

PREPARATION OF THE HEATING NETTING

Figure 1:
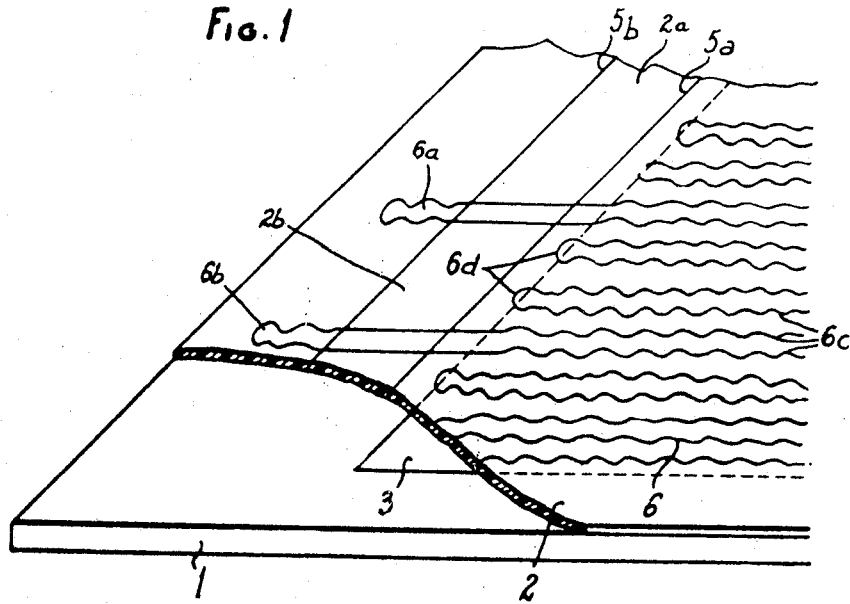
FIGURE 1 is a fragmentary perspective view depicting details of the preliminary preparation of the heating netting.

Considering now FIGURE 1 it will be seen that a foil 2 formed of transparent plastic, such as for instance polyvinyl butyral, is placed upon a planar support, for example a glass plate 1 which is larger than the glass structure which is to be produced. This foil 2 is bonded with the edges of the glass plate 1 by means of heat, however, is separated from the aforesaid glass plate 1 in the central region, in other words beneath the heating netting 6 to be provided—as will be explained shortly—by means of a very thin foil 3 formed of a substance such as that which is known on the market under the trademark "Mylar." It will be appreciated that this separation foil 3 prevents bonding of the polyvinyl butyral foil 2 with the glass plate 1 in this central region, which in consideration of the subsequent process steps should permit easy separation of such polyvinyl butyral foil 2 carrying the heating netting 6. The glass support plate 1 is provided with a crack or break line 4 (FIGURE 2) which designates the periphery or contour of the glass structure to be manufactured and which simplifies arrangement of the heating netting 6, as such will further be considered shortly.

It will be further seen that two cuts 5a and 5b are undertaken at the entire thickness of the polyvinyl butyral foil 2. Such cuts 5a and 5b end approximately at the region of the break line 4 provided at the glass support plate 1. Thereafter, and according to a known process, in the next machine the heating wire netting is placed upon the polyvinyl butyral foil 2, the latter thus serving as carrier. With the exception of the zone 2a bounded by the cuts 5a and 5b of the mentioned carrier foil 2 at which the wires 6c of the heating netting 6 should not be bonded with the butyral, these wires are bonded by the action of heat with the polyvinyl butyral foil 2. As can be readily ascertained from the drawings, the heating wires 6c are arranged in undulatory or sinusoidal form, the amplitude of which for example amounts to 0.3 to 0.4 millimeters and the wave length of which can amount to 1 millimeter. By way of example, in the illustrated embodiment the resistance wires 6c possess a spacing from one another amounting to about 0.6 to 0.8 millimeters. Furthermore, by way of example, it is possible to use wires formed of tungsten, ferro-nickel or copper, with a diameter of 15 to 13 microns, in the event it is desired to develop greater electrical power in the order of magnitude of 50 to 80 watts per square decimeter.

Figure 2:
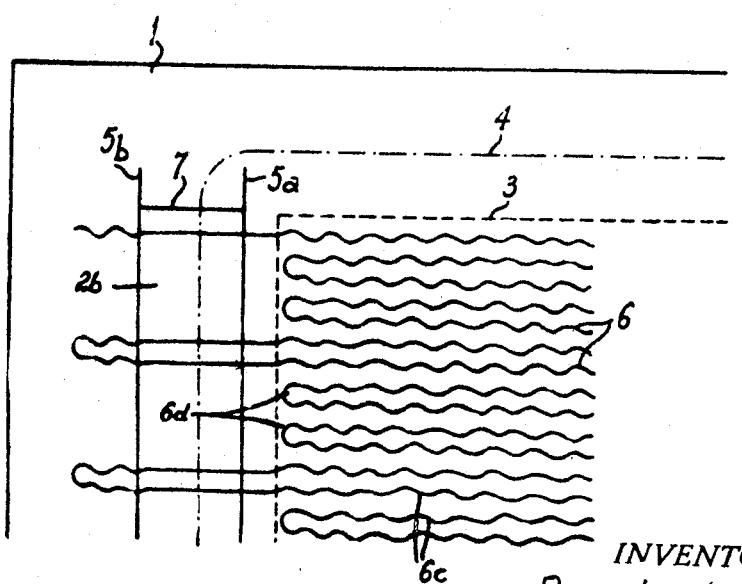
FIGURE 2 is a top plan view of the arrangement of FIGURE 1.

Moreover, from FIGURES 1 and 2 it will be seen that certain wires, such as those designated by reference characters 6a and 6b, of the heating netting 6 are elongated to extend past the cut 5b, whereas others are bent back in order to build a respective loop 6d at the other side of the cut 5a. After the heating netting 6 is placed upon the carrier foil 2 formed of polyvinyl butyral the latter is removed from the glass plate 1 serving as support. Thereafter, the foil 2 can be cut along the lines 7 at both ends of the cuts 5a and 5b, as best seen by referring to FIGURE 2, and the strip 2b bounded by the walls of such cuts is removed.

MOUNTING OF THE HEATING NETTING UPON THE OUTER PLATE OF THE GLASS STRUCTURE

Figure 3:
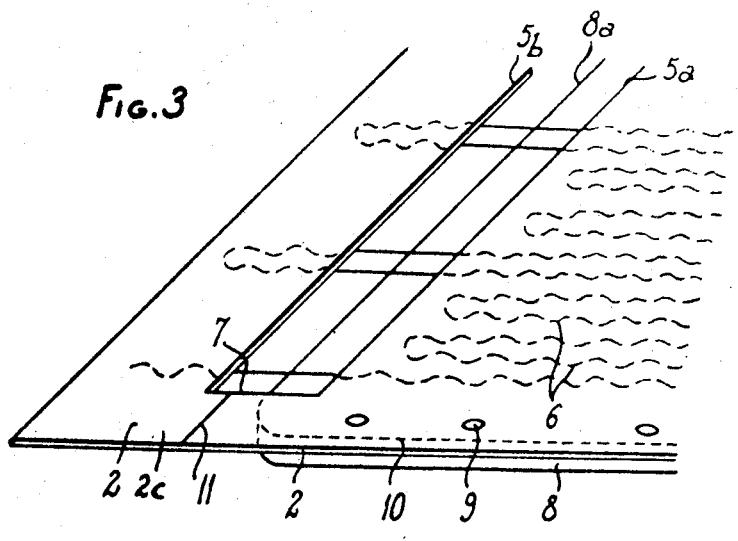

By referring to FIGURE 3 it will be seen that the heating netting 6 carried by the foil 2 formed of polyvinyl butyral is turned over and placed upon the external or outer plate 8 of the glass structure. The heating netting 6 is turned over in order that the wires 6c thereof come into direct contact with the inner surface of the external plate 8, thereby favoring heating thereof. After correct centering of the polyvinyl butyral foil 2 carrying the heating netting 6 with respect to the periphery of the plate 8 this foil is spatially fixed at individual points, such as designated by reference numeral 9, by the action of heat. The protruding polyvinyl butyral foil 2 is then cut in accordance with the shape 10 of the outer plate 8.

Figure 3A:
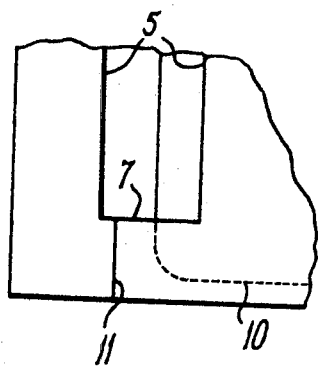
Figure 4:
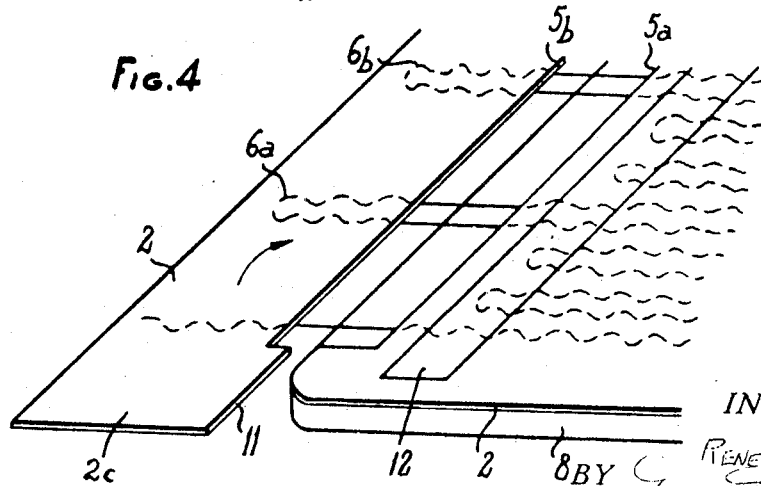

It will be further apparent by inspecting FIGURE 3 that assembly of the butyral foil 2 upon the plate 8 takes place in such a manner that the edge 8a of the aforesaid plate 8 extends approximately through the middle of the zone 2a of the strip 2b removed from between the cuts 5a and 5b. Also, the butyral foil 2 is then cut along the lines 11 between its edge and the associated cut line 7 (FIGURE 3a). It will thus be appreciated that the fabrication procedure described up to the present then provides a structure such as depicted in FIGURE 4, in which the wires 6c are illustrated in phantom lines (as also in FIGURE 3) because they are located at the underside of the polyvinyl butyral foil 2.

Thereafter, a lead-in wire or electrode 12 is bonded to the polyvinyl butyral foil 2 by the action of heat, this lead-in wire being formed of a tin plated copper strip or band 12. It will be appreciated that in the illustrated embodiment the strip 12 is arranged at a distance of approximately 1 to 2 millimeters from the cut line 5a.

SOLDERING OF THE HEATING WIRES WITH THE ELECTRODES

The protruding or extending polyvinyl butyral strip 2c of the carrier foil 2 which carries the ends of the heating wires 6a, 6b, etc. which extend past the cut line 5b (FIGURE 4) is then tilted back and by pivoting about the cut line 5a (FIGURE 5) or a line extending parallel to this cut line and nearer the neighboring edge of the plate 8 is flipped back upon the remainder of the polyvinyl butyral foil 2. These wires are then soldered with the electrode 12, for instance at the locations designated 13, 13', 13" and thereafter are separated at locations 14, 14', 14", whereafter this flipped-back butyral strip 2c which carries the ends 6a, 6b, etc., of the wires is removed. Then a second strip 15 formed of tin plated copper is soldered via the wires to the electrode 12. In order to ensure for a continuity of the polyvinyl butyral foil 2 at the region 16, a correspondingly shaped polyvinyl butyral strip 16a is cut and placed at this location.

Of course, it will be appreciated and should be clearly understood that all of these manufacturing steps are undertaken at two opposite edges of the glass structure. Now, only the glass plate 18 must be assembled which should form the inner plate of the heating glass structure. This glass plate 18 is previously provided with a polyvinyl butyral foil 17. The unit 17, 18 is then positively centered and by the action of heat is bonded to the heating plate produced in accordance with the aforedescribed process steps. In FIGURE 6 there is depicted a plan view of the completed glass structure. By referring to FIGURE 7, which shows a section through the thus produced glass structure, it is possible to readily ascertain that the heating wires 6 are directly in contact with the external or outer plate 8, whereas the electrodes 12, 15 are completely enclosed in polyvinyl butyral. On the other hand, from an inspection of FIGURE 6 it will be seen that the lead-in conductors or electrodes 12, 15 are arranged in a zone of the glass structure which is partially covered by the heating netting 6, which was not the case with the previous assembly of such glass structure according to prior art methods. It is also to be understood that the sequence of steps need not in every case be as outlined herein. For instance, the strip 2b can be cut after placing of the foil 2 upon the plate 8.

While there is shown and described a present preferred embodiment of the invention it is to be distinctly understood that the invention is not limited thereto but may be otherwise variously embodied and practiced within the scope of the following claims.

What is claimed is:

1. A heating glass structure of the type described comprising a pair of glass plates and, sandwiched between said glass plates, a carrier of a foil formed of transparent plastic and a layer of wire means providing electrical resistors embedded upon one surface of said carrier such that said wire means is indirect contact with the inner surface of one of said glass plates, said wire means and said carrier extending between two opposite edges of said glass structure, at least one electrode disposed on the other side of said carrier at opposite ends thereof, thereby being separated from said wire means, and in spaced relation from each neighboring edge of said opposite edges of said glass structure to provide a respective space separating each respective electrode from its neighboring edge, said layer of wire means including a respective number of wires extending into at least a portion of the associated separating space in the direction toward its neighboring edge, and being flexed backwardly through substantially 180° to overlap said electrodes and being connected thereto.

2. A heating glass structure as defined in claim 1 wherein said transparent plastic is polyvinyl butyral.

References Cited

UNITED STATES PATENTS

| | | | |
|---|---|---|---|
| 2,274,839 | 3/1942 | Marick | 219—549 X |
| 2,526,327 | 10/1950 | Carlson | 219—203 X |
| 2,932,710 | 4/1960 | Coale et al. | 219—544 X |
| 3,290,807 | 12/1966 | Esaka | 38—71 |

VOLODYMYR Y. MAYEWSKY, Primary Examiner

U.S. Cl. X.R.

219—203, 541, 544